Oct. 9, 1956  G. F. DRAKE  2,765,800
CONTROL FOR FLUID SERVO ACTUATED VALVE
Filed March 28, 1952
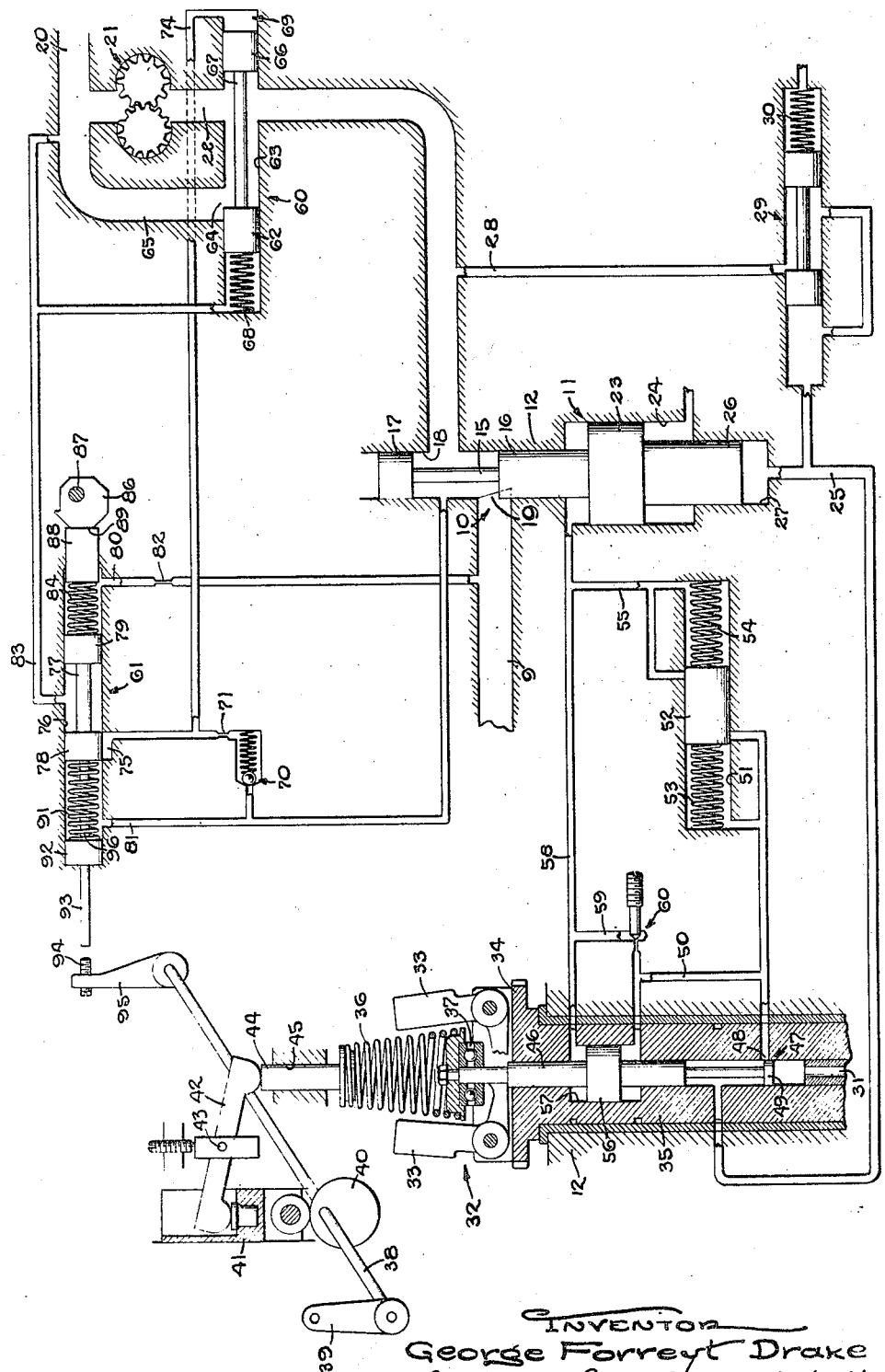
INVENTOR
George Forrest Drake
By Carlson, Pitzner, Hubbard & Wolfe
ATTORNEYS

United States Patent Office 2,765,800
Patented Oct. 9, 1956

2,765,800

CONTROL FOR FLUID SERVO ACTUATED VALVE

George Forrest Drake, Rockford, Ill., assignor to Woodward Governor Company, Rockford, Ill., a corporation of Illinois Application March 28, 1952, Serial No. 279,080

3 Claims. (Cl. 137—26)

This invention relates to fluid pressure systems including a fluid flow control valve and a fluid actuated servo therefor selectively energized by a condition responsive device to vary the fluid flow through the valve.

One object is to provide a new and improved means for proportioning the flow of fluid through the main valve accurately in proportion to changes in the position of the movable valve member while at the same time permitting adjustment of the valve position for a given condition of the condition responsive device.

Another object is to automatically maintain a predetermined pressure differential across said main valve in a novel manner and selectively adjust the amount of said differential to modify the action of the valve.

A further object is to adjust said pressure differential automatically with changes in the control point of the condition responsive device by which the main fluid servo is energized.

Other objects and advantages of the invention will become apparent from the following detailed description taken in connection with the accompanying drawing which is a schematic view and hydraulic circuit diagram of a fluid servo system embodying the novel features of the present invention.

For purposes of illustration, the invention is shown in the drawing incorporated in a system for varying the energization of a fluid pressure servo 11 automatically in accordance with changes in a condition such as speed and correspondingly regulating the flow of pressure fluid through a valve 10 to a point of use through a passage 9. The valve and the ports governing its operation are housed within a casing 12, the valve shown comprising a plunger 15 having spaced lands 16 and 17 thereon slidable in a bore 18. The land 16 coacts with an outlet port 19 which is generally V-shaped to effect a uniform change in the flow through the valve for each increment of plunger movement throughout the full range. Liquid from a suitable source is supplied to the inlet 20 of a power driven pump 21 which may be of the gear type with its outlet connected to a passage 22 leading into the bore 18 between the valve lands.

The servo 11 for actuating the valve 10 comprises a piston 23 fast on the valve member 16 and slidable in a cylinder 24. Herein, the piston is biased in the valve closing direction by pressure from a supply line 25 acting on the end of a piston 26 rigid with the piston 23 and slidable in a cylinder 27 substantially smaller in size than the piston 23. Fluid delivered by the pump 21 is supplied to the line 25 through a passage 28 and an automatic regulating valve 29 loaded by a spring 30 and acting to maintain the pressure in the line 25 at a constant value.

Energization of the servo is varied by controlling the pressure on the larger end of the piston 23 by admitting fluid from the line 25 to the cylinder 24 or by releasing fluid from the cylinder to a drain passage 31. While such flow of the fluid may be controlled automatically in response to changes in any electrical, physical, or chemical condition, the control shown herein for purposes of illustration comprises a governor 32 sensitive to changes in speed for example, that of a prime mover supplied with fuel delivered through the valve 10.

The governor 32 may be of the construction disclosed in Patent No. 2,478,753 which may be referred to for further details. The speed senser of the governor comprises a pair of flyweights 33 pivoted on a ball head 34 in the form of a gear which is fast on the upper end of a ported sleeve 35 rotatable in a bushing supported in the casing 12. The ball head is geared or otherwise suitably coupled to a source of rotary power whose speed is to be sensed.

The centrifugal force acting on the flyweights is balanced against a compression spring 36 bearing downwardly on the arms of the flyweights through a ball thrust bearing 37. The speed setting of the governor may be adjusted manually by turning a shaft 38 journaled in the casing 12 and carrying a selector arm 39. A cam 40 fast on the shaft acts on a slidable plunger 41 whose motion is transmitted through a lever 42 fulcrumed at 43 to a plunger 44 slidable in a bore 45 and abutting against the upper end of the speeder spring 36 which is compressed and extended as the selector 39 is turned counterclockwise and clockwise respectively to increase and decrease the speed setting.

The control force derived from changes in the flyweight speed is applied to a plunger 46 of a pilot valve 47 formed by a port 48 coacting with a land 49 on the plunger. The latter is slidable in the sleeve 35 and is connected at its upper end to the upper race of the bearing 37. Below the land 49, the sleeve 35 communicates with the drain passage 31. Through a hole in the sleeve 35 the pressure supply line 25 communicates continuously with the space above the valve land. The outlet port 48 is connected to a passage 50 communicating with one end of a cylinder 51 having a piston 52 slidable therein and urged toward a centered position by compression springs 53 and 54. The other end of the cylinder communicates through a passage 55 with the upper end of the servo cylinder 24 so that pressure fluctuations in the passage 50 are communicated to the top of the servo piston 23 through the intermediary of the piston 52.

A compensating system for producing isochronous operation of the governor 32 includes a piston 56 fast on the valve stem 46 and reciprocable in a cylinder 57 connected at its lower end to the valve controlled passage 50. A passage 58 extends from the upper end of the cylinder 57 to the passage 55 and the servo cylinder 24. A by-passage 59 having a needle valve 60 therein permits slow leakage of fluid between the passages 50 and 58. As more fully described in the aforesaid patent, lowering of the land 49 below its neutral position opposite the port 48 in response to a speed decrease below the prevailing setting of the governor results in forcing fluid into the servo cylinder 24 thus causing the piston 23 to be moved downwardly. Conversely a detected rise in speed causes the valve land to be raised above the port 48 allowing fluid to escape to the drain thus decreasing pressure in the passage 50 which allows the piston 23 to move under its constant bias in the valve closing direction.

To proportion the fluid flow accurately in accordance with changes in the position of the valve plunger 16, the excess of the fluid delivered by the pump 21 is by-passed back to the pump inlet 20 automatically under the control of a valve 60 which responds to the pressure drop across the main valve 10 and operates automatically in conjunction with a pressure responsive pilot valve 61 to maintain this drop constant within very close limits. For this purpose, the by-pass valve 60 comprises a land 62 slidable in a bore 63 and cooperating with a port 64 which communicates with a return or by-passage 65 leading to the pump inlet. The pump outlet 21 communicates continuously with the bore 63 at a point between the land 62 and a piston 66 connected to the land by a plunger 67 and also slidable in the bore.

The plunger is urged by a compression spring 68 in a direction to close the by-pass valve 60 and is shifted in the other direction by a servo actuator 69 formed by the piston 66 and the cylinder 63 and variably energized under the control of the pilot valve 61 which is sensitive to changes in the pressure difference between the inlet and outlet passages 22 and 9 of the main fuel valve 10. To this end, the servo cylinder 63 beyond the outer end of the piston 66 communicates through a passage 74 with a port 75 which opens into a cylinder 76 in which slides a plunger 77 having spaced pistons 78 and 79 thereon. Opposite ends of the cylinder 76 are connected through passages 80 and 81 to the main valve passages 9 and 22, there being a pressure reducing restriction 82 in the former to permit the pressure in the outer end of the cylinder 76 to be reduced by the use of a relatively small relief valve 70 described later. A passage 83 leads from the intermediate portion of the cylinder 76 to the fluid return line or pump inlet 20.

When the supply pressure acting on the piston 78 just balances the combined force of a compression spring 84 and the pressure in the fluid delivery passage 9 both of which act on the piston 79, the piston 78 will be centered and the port 75 will be covered by the piston 78 as shown in the drawing. If the supply pressure increases above this value, the plunger 77 will be forced to the right admitting high pressure fluid through the port 75 and the passage 74 to the cylinder 63, and the increased force thus acting on the piston 66 will force the plunger 67 to the left and by-pass to the pump inlet 20 a greater part of the fluid delivered by the pump 21. Conversely, if the difference between the supply and delivered pressures decreases below the desired value, the pilot plunger 77 will be moved to the left uncovering more of the port 75 and permitting fluid to escape from the cylinder 63 so as to reduce the force on the servo piston 66 and initiate closure of the valve 60. The amount of the by-pass is thus reduced until the proper pressure differential across the main valve 10 is again attained.

If, for any reason, the pressure in the delivery line 22 ever exceeds a safe value, an adjustable spring loaded check valve 70 communicating with the valve outlet 81 opens admitting pressure fluid through the line 74 to the piston 66 of the regulating valve 60. The increased pressure on the latter moves the plunger 67 to open the valve 60 thereby causing the pressure differential across the valve 10 to drop. The plunger 77 of the valve 61 is thus allowed to move to the left. Fluid is thus permitted to drain out through the port 75 and a restriction 71 which limits the flow until the abnormal pressure has been relieved.

By utilizing the pilot valve 61 in the manner described above, deviations in the pressure drop across the valve 10 from the value desired are sensed without actual movement of the by-pass valve plunger 67 and the energization of the servo 69 is changed correspondingly. Extremely close regulation of the pressure drop across the valve is thus attained so that the rate of fluid flow always corresponds accurately with the position of the valve member 16.

In accordance with one aspect of the invention, advantage is taken of a characteristic of the pressure regulating system above described to vary the pressure which, for a given value of the condition sensed by the condition responsive device 32, is maintained in the delivery passage 9 by the action of the servo 11 in adjusting the main valve 10. To effect such adjustment, it is only necessary to vary the loading of the pilot valve 61 as by angularly turning a cam 86 fast on a shaft 87 and acting on a follower 88 slidable through the end of the cylinder 76 and bearing against the outer end of the spring. The shaft is journaled in the casing 12 and adapted to be held in different positions of adjustment by suitable means. In the present instance, the shaft is adjustable in predetermined steps corresponding to flat surfaces 89 spaced around the periphery of the cam 86 and disposed at different distances from the axis. The spring force acting through the follower and on one of the parts 89 of the cam thus holds the cam in the selected position.

By turning the cam to different positions, the stress of the spring 84 may be adjusted thus varying pressure differential to which the valve 61 responds and therefore the pressure drop across the valve 10. Accordingly, the flow of fluid through the delivery passage 9 for a given position of the valve may be adjusted as desired and independently of the action of the condition responsive device 32.

In automatic control systems of the above character, it is frequently desirable to vary the rate of fluid delivery through the passage 9 in accordance with changes in the setting of the control point of the condition responsive device 32. This may be accomplished conveniently by varying the loading of the pilot valve 61 with changes in the position of the shaft 38 by which the speed setting of the governor 32 is adjusted. As an example, let it be assumed that the pressure drop across the valve 10 is to be reduced progressively as the selector 39 is turned in the speed decreasing direction below a predetermined speed value. For this purpose, this movement of the selector 39 is utilized to increase the loading imposed on the pressure sensing pilot valve 61 by a spring 91 acting in opposition to the main loading spring 84 of this valve. Herein, the spring 91 is of the compression type and is arranged within the cylinder 76 with one end abutting against the land 78 and the other end engageable with an abutment 92 on a rod 93 which slides through the end of the cylinder 76 for engagement with the end of a screw 94 threaded through the free end of an arm 95. The latter is fast on the selector shaft 38 and positioned for engagement of the screw 94 with the end of the rod 93 when the selector, in moving in the speed decreasing direction, moves beyond a predetermined position. In this movement, the abutment 92 is moved away from its normal position against the end of the cylinder 76, and the force of the spring 91 is increased thus reducing the resultant leftward force on the plunger 77 by which force the maintained supply pressure is determined. The pressure drop across the valve 10 is reduced correspondingly thereby decreasing the amount of fluid which flows through the valve when the auxiliary loading spring 91 is active. The amount of the decrease in the supply pressure increases as the shaft 38 is turned further in the clockwise direction.

If desired, the flow of fluid through the valve 10 may be cut off completely by continuing the clockwise turning of the selector shaft 38 beyond the position in which the extended inner end 96 of the rod 93 engages the pilot valve plunger 77. The latter is thus shifted to the right fully opening the relief valve 61. This drops the pump discharge pressure to the lowest possible value when the pump 21 is operating and the valve 10 is closed.

I claim as my invention:

1. In a system of the character described, the combination of, a source of fluid under pressure, a main valve controlling the flow of fluid from said source and having an inlet and an outlet and a member movable to vary the fluid flow therebetween, a fluid servo for positioning said valve according to the degree of energization of the servo, condition responsive mechanism operable selectively to control the admission of fluid from said source of said servo, an adjuster selectively movable to different positions to vary the control point of said condition responsive means, a second valve regulating the pressure of said fluid in said inlet, a fluid actuator for positioning said second valve in accordance with the energization of said actuator, means including a third valve controlling the flow of fluid from said inlet to said actuator and having a piston responsive to the pressures in said inlet and said outlet whereby to vary the energization of said actuator and maintain a predetermined pressure difference between said inlet and outlet, a spring for loading said piston and selectively adjustable to vary the force acting on the piston, and mechanism movable by said adjuster to change the force exerted by said spring on said piston.

2. In a system of the character described, the combination of, a source of fluid under pressure, a main valve controlling the flow of fluid from said source and having an inlet and an outlet and a member movable to vary the fluid flow therebetween, a fluid servo for positioning said valve according to the degree of energization of the servo, condition responsive mechanism operable selectively to control the admission of fluid from said source to said servo, an adjuster selectively movable to different positions to vary the control point of said condition responsive means, a second valve regulating the pressure of said fluid in said inlet, a fluid actuator for positioning said second valve in accordance with the energization of said actuator, means including a third valve controlling the flow of fluid from said inlet to said actuator and having a piston responsive to the pressures in said inlet and said outlet whereby to vary the energization of said actuator and maintain a predetermined pressure differential between said inlet and outlet, and a connection between said adjuster and said piston including a spring and an adjustable lost motion device and operable after the slack in said device has been taken up to transmit the movements of the adjuster to said piston to vary the force exerted thereon.

3. In a system of the character described, the combination of, a source of fluid under pressure, a main valve controlling the flow of fluid from said source and having an inlet and an outlet and a member movable to vary the fluid flow therebetween, a fluid servo for positioning said valve according to the degree of energization of the servo, condition responsive mechanism operable selectively to control the admission of fluid from said source to said servo, an adjuster selectively movable to different positions to vary the control point of said condition responsive means, a second valve regulating the pressure of said fluid in said inlet, a fluid actuator for positioning said second valve in accordance with the energization of said actuator, means including a third valve controlling the flow of fluid from said inlet to said actuator and having a piston responsive to the pressures in said inlet and said outlet whereby to vary the energization of said actuator and maintain a predetermined pressure differential between said inlet and outlet, a spring for exerting a supplemental loading force on said piston, and a connection for transmitting the movement of said adjuster to said spring to vary the force exerted on the piston.

References Cited in the file of this patent

UNITED STATES PATENTS

| 1,538,427 | Earl | May 19, 1925 |
| 1,904,475 | Kissing | Apr. 18, 1933 |
| 2,102,865 | Vickers | Dec. 21, 1937 |
| 2,422,808 | Stokes | June 24, 1947 |
| 2,478,753 | Parker | Aug. 9, 1949 |
| 2,581,275 | Mock | Jan. 1, 1952 |
| 2,616,507 | Greenland | Nov. 4, 1952 |

FOREIGN PATENTS

| 634,095 | Great Britain | Mar. 15, 1950 |